United States Patent
Drahm et al.

(10) Patent No.: US 6,662,120 B2
(45) Date of Patent: Dec. 9, 2003

(54) EXCITATION CIRCUITS FOR CORIOLIS MASS FLOWMETERS

(75) Inventors: Wolfgang Drahm, Erding (DE); Alfred Rieder, Landshut (DE); Christian Matt, Aesch (CH)

(73) Assignee: Endress + Hauser Flowtec AG, Reinach (CH)

( * ) Notice: Subject to any disclaimer, the term of this patent is extended or adjusted under 35 U.S.C. 154(b) by 6 days.

(21) Appl. No.: 10/173,763

(22) Filed: Jun. 19, 2002

(65) Prior Publication Data

US 2003/0010136 A1 Jan. 16, 2003

Related U.S. Application Data

(60) Provisional application No. 60/301,013, filed on Jun. 26, 2001.

(30) Foreign Application Priority Data

Jun. 19, 2001 (EP) .............................. 01114644

(51) Int. Cl.[7] .............................................. G06F 17/00
(52) U.S. Cl. .................... 702/43; 702/45; 73/861.354; 73/861.355; 73/861.356
(58) Field of Search ..................... 73/1–16, 861.355, 73/861.356, 861.357; 702/43, 45, 46, 55, 100, 188, 189

(56) References Cited

U.S. PATENT DOCUMENTS

| | | | | |
|---|---|---|---|---|
| 4,793,191 A | * | 12/1988 | Flecken et al. | 73/861.357 |
| 5,351,561 A | * | 10/1994 | Wenger et al. | 73/861.357 |
| 5,394,758 A | * | 3/1995 | Wenger et al. | 73/861.355 |
| 5,531,126 A | * | 7/1996 | Drahm | 73/861.357 |
| 5,557,973 A | * | 9/1996 | Koudal et al. | 73/861.355 |
| 5,602,345 A | * | 2/1997 | Wenger et al. | 73/861.357 |
| 5,616,868 A | * | 4/1997 | Hagenmeyer et al. | 73/861.357 |
| 5,675,093 A | * | 10/1997 | Young et al. | 73/861.355 |
| 5,705,754 A | * | 1/1998 | Keita et al. | 73/861.357 |
| 5,736,653 A | * | 4/1998 | Drahm et al. | 73/861.356 |
| 5,796,011 A | * | 8/1998 | Keita et al. | 73/861.357 |
| 5,869,770 A | | 2/1999 | Yoshimura et al. | 73/861.355 |
| 6,006,609 A | * | 12/1999 | Drahm et al. | 73/861.357 |
| 6,223,605 B1 | * | 5/2001 | Koudal et al. | 73/861.357 |
| 6,606,573 B2 | * | 8/2003 | Wheeler | 702/56 |

FOREIGN PATENT DOCUMENTS

| | | |
|---|---|---|
| EP | 1079213 A2 | 2/2001 |
| EP | 1094307 A1 | 4/2001 |
| WO | WO 88/02476 | 4/1988 |

* cited by examiner

*Primary Examiner*—Kamini Shah
(74) *Attorney, Agent, or Firm*—Jones, Tullar & Cooper, P.C.

(57) ABSTRACT

Such an excitation circuit is intended for use in a Coriolis mass flowmeter which is connected to, is powered exclusively from, and outputs a measurement signal exclusively via, a two-wire process control loop. The Coriolis mass flowmeter has a vibrating flow tube and an excitation assembly for vibrating the flow tube at a frequency equal or adjacent to the instantaneous mechanical resonance frequency of the flow tube. It further comprises transducer assemblies which are positioned at a given distance from each other along the flow tube and provide respective transducer signals. The excitation circuit may comprise a peak detector to which one of the transducer signals is applied as an input signal, a comparsion stage which determines a deviation of the output signal of the peak detector from an adjustable reference signal that specifies an amplitude of the vibration of the flow tube, a multiplier for the input signal to the peak detector and the output signal from the comparsion stage, and an output stage having an input connected to an output of the multiplier and supplying the excitation assembly. Instead of the multiplier, a pulse duration modulator or a DC/DC converter and a comparator may be provided.

34 Claims, 7 Drawing Sheets

EXCITATION CIRCUITS FOR CORIOLIS MASS FLOWMETERS

This application is a non-provisional application based upon provisional application, Serial No. 60/301,013, filed Jun. 26, 2001.

FIELD OF THE INVENTION

This invention relates to excitation circuits for Coriolis mass flowmeters which are connected to, are powered exclusively from, and output a measurement signal exclusive via, a two-wire process control loop. In the following, such a mass flowmeter will be referred to as a two-wire mass flowmeter.

BACKGROUND OF THE INVENTION

Coriolis mass flowmeters were described theoretically long ago and have been known in their currently commercially available form for about 25 years. This form of flowmeter contains a mechanical sensor which comprises at least one straight flow tube or at least one flow tube bent in one plane or three-dimensionally as well as associated electronics. The flow tube is fixed at the inlet and outlet ends. In operation it is excited into vibrations between these fixing points.

Conventional mass flowmeters are power-line-operated devices and must therefore have at least two electric leads, i.e., two wires. The measurement signal representative of, and particularly proportional to, mass flow rate is produced and output according to a standard established for this purpose, such as the 4- to 20-mA current standard, a usual frequency standard, or a digital standard; for this, two further wires are necessary.

In EP-A 10 94 307, the possibility of providing Coriolis mass flowmeters with only two wires, i.e., to design the latter as two-wire mass flowmeters, is mentioned more in passing and only briefly; such two-wire mass flowmeters are not yet on the market.

As can be seen from the aforementioned EP-A, two-wire meters deliver as a measurement signal an output current whose instantaneous values represent a signal provided by a physical-to-electrical transducer as proportionally as possible. The two wires serve both to supply power, for which purpose a DC voltage source must be connected to the two wires from outside, and to transmit the measurement signal.

In the case of two-wire meters according to the above-mentioned 4- to 20-mA current standard, a given current value within this current range corresponds to exactly one measurement-signal value. Only the current range below 4 mA is usable for the supply of power to the electronics of the two-wire meter. As a result, power is available only on the order of 50 mW, which will hereinafter be referred to as "low power".

In view of these facts, two-wire meters with the aforementioned 4- to 20-mA current standard are particularly suited for use in potentially explosive atmospheres.

Furthermore, two-wire meters are frequently designed to be capable of cooperating with one of the conventional field buses. This can be accomplished by connecting the meter to the field bus directly, e.g., according to the FIELDBUS protocol (FIELDBUS is a registered trademark of FIELD-BUS FOUNDATION), or indirectly via a bus coupler, e.g., according to the so-called HART protocol (HART is a registered trademark of the HART User Group).

The aforementioned electronics of Coriolis mass flowmeters comprise an excitation circuit and an evaluation circuit.

The excitation circuit serves to vibrate the at least one flow tube through which passes the fluid to be measured.

The vibration occurs at a frequency equal or adjacent to the instantaneous mechanical resonance frequency of the flow tube; one of the parameters determining the resonance frequency is the density of the fluid; the density, in turn, is dependent on the temperature of the fluid. Therefore, conventional mass flowmeters include at least one temperature transducer.

Since the vibrating flow tube serves to measure mass flow rate—this is the fluid mass per unit time—, the evaluation circuit produces a corresponding measurement signal.

The available low power must suffice to supply the excitation and evaluation circuits. An evaluation circuit particularly suited for this purpose is the circuit disclosed in EP-A 10 59 515, corresponding to U.S. patent application Ser. No. 09/579,384, filed May 20, 2000. An excitation circuit requiring so little power has not yet been described in the prior art, however.

SUMMARY OF THE INVENTION

It is therefore an object of the invention to provide excitation circuits having a low power consumption and, thus, being suitable for two-wire Coriolis mass flowmeters.

To attain this object the invention provides an excitation circuit for a Coriolis mass flowmeter having at least one vibrating flow tube, an electromechanical excitation assembly for vibrating the at least one flow tube at a frequency equal or adjacent to the instantaneous mechanical resonance frequency of the flow tube; a tranducer assembly for generating a first transducer signal representing inlet-side vibrations of said measuring tube and a second transducer signal representing outlet-side vibrations of said measuring tube: The excitation circuit according to the invention comprises an demodulation stage fed by one of the transducer signals or a sum of both transducer signals, said demodulation stage being operable to generate an output signal representing an oscillation amplitude of said vibrating tube, a comparison stage fed by the output signal of the demodulation stage, said comparison stage being operable to generate an output signal representing a deviation of said oscillation amplitude of the vibrating tube from an predetermined reference oscillation amplitude for said vibrations.

In a first variant of the invention the excitation circuit further comprising an amplitude modulation stage for modulating said signal fed to the demodulation stage with said output signal from the comparision stage, said amplitude stage being operable to generate a drive signal for supplying said excitation assembly.

In a second variant of the invention the excitation circuit further comprising an pulse duration modulation stage for modulating said signal fed to the demodulation stage with said output signal from the comparision stage, said pulse duration stage being operable to generate a drive signal for supplying said excitation assembly.

In a preferred embodiment of the first variant of the invention the demodulation stage comprises a peak detector for detecting the amplitude of said signal fed to the demodulation stage.

In a further preferred embodiment of the invention the demodulation stage comprises a preamplifier for preamplifying said signal fed to the demodulation stage.

In another preferred embodiment of the invention, the comparsion stage comprises an amplifier, an integrating amplifier, or a differentiating and integrating amplifier.

In a preferred embodiment of the first variant of the invention, the amplitude modulation stage comprises a DC/DC converter fed by the output signal of the comparision stage, said converter delivering a DC voltage having an amplitude depending on the output signal from the comparision stage.

In a further preferred embodiment of the first variant of the invention, the output stage comprises a complementary push-pull stage which is supplied with the DC voltage delivered by the DC/DC converter.

In another preferred embodiment of the first variant of the invention, the amplitude modulation stage comprises an output stage with an operational amplifier wired as follows: An inverting input is connected to ground through a first resistor. A noninverting input is connected to the output of the multiplier through a second resistor, which has the same value as the first resistor. An output is connected via a third resistor to a first terminal of a primary winding of a transformer, a second terminal of which primary winding is connected to ground, said transformer having a secondary winding connected to the electromechanical excitation assembly and being a step-up transformer; the inverting input is connected via a fourth resistor to the first terminal of the primary winding; and the noninverting input is connected via a fifth resistor, which has the same value as the fourth resistor, to the output.

In a preferred embodiment of the second variant of the invention, the output stage comprises a complementary push-pull stage which is supplied with a constant positive DC voltage and a constant negative DC voltage.

Furthermore, it is an object of the invention to provide a two-wire Coriolis mass flowmeter which is connected to, is powered exclusively from, and outputs a measurement signal exclusively via, a two-wire process control loop.

To attain this object the invention provides further a Coriolis mass flowmeter comprising an excitation circuit according to the first or the second variant of the invention.

In a preferred embodiment of the Coriolis mass flowmeter according to the invention, the two-wire process control loop carries a DC supply current; in particular, the measurement signal is a direct current, preferably in a range of 4 to 20 mA, or a digital signal, in which case the Coriolis mass flowmeter is connected to a field bus, particularly by means of the two-wire process control loop.

BRIEF DESCRIPTION OF THE DRAWINGS

Advantages of the invention and the invention itself will now be explained in more detail with reference to the accompanying drawings, which show preferred embodiments of the invention. Parts having similar functions are designated by similar reference characters throughout the various figures of the drawings, but these reference characters are repeated in subsequent figures only if this appears appropriate. In the drawings.

DETAILED DESCRIPTION OF EXEMPLARY EMBODIMENTS

Figure 1:
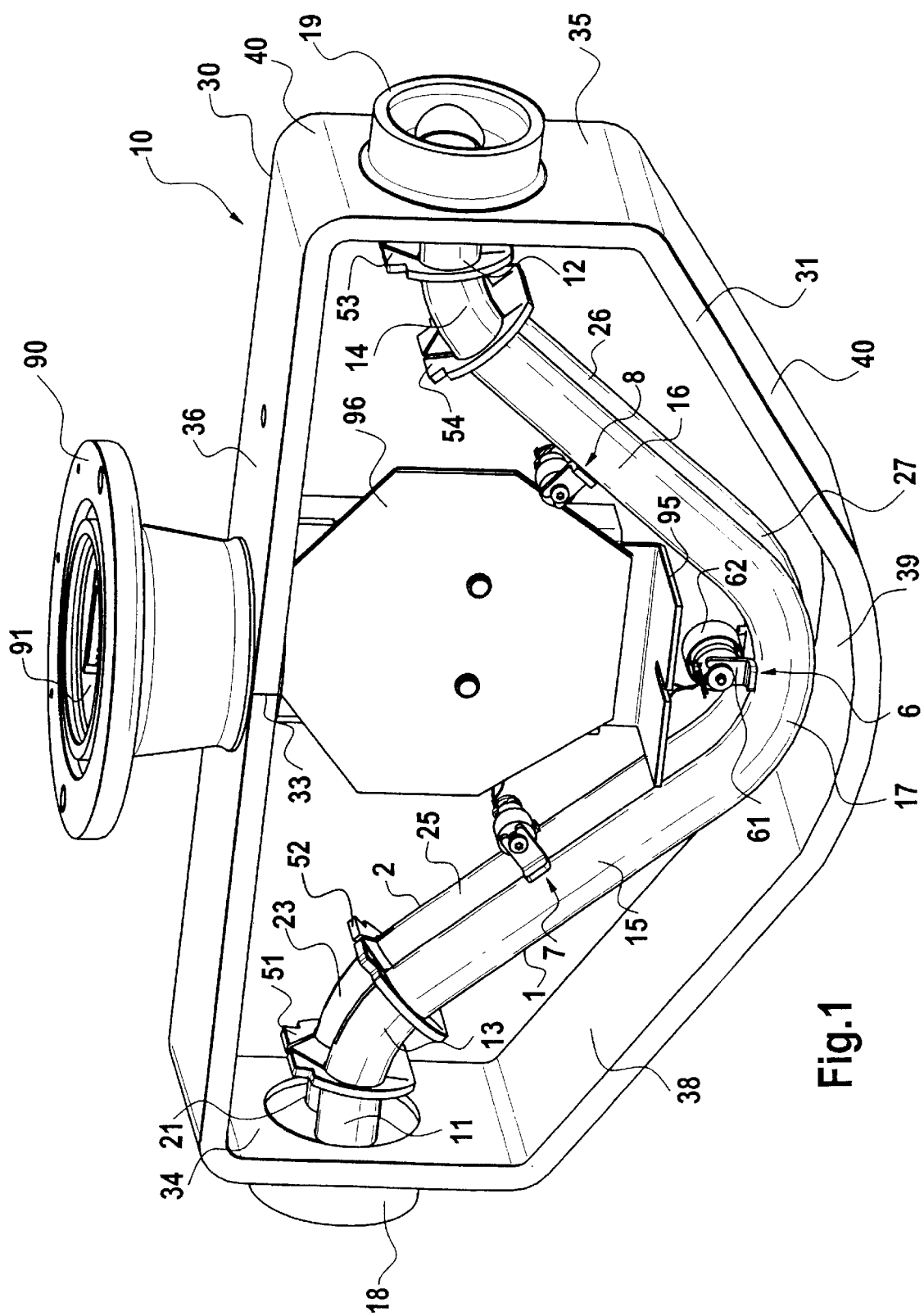
FIG. 1 is a perspective view showing mechanical details of a mass flow sensor preferred for use together with the invention, with its housing not completed.

While the invention is susceptible to various modifications and alternative forms, exemplary embodiments thereof have been shown by way of example in the drawings and will herein be described in detail. It should be understood, however, that there is no intent to limit the invention to the the particular forms disclosed, but on the contrary, the intention is to cover all modifications, equivalents, and alternatives falling within the spirit and scope of the invention as defined by the intended claims.

FIG. 1 shows mechanical details of a Coriolis, mass flow sensor preferably suited for the invention, hereinafter referred to as a sensor 10 for short, in a perspective view. This sensor is described in the prior EP Application 00 11 0091.6 of May 12, 2000, corresponding to U.S. patent application Ser. No. 60/205,983.

Figure 2:
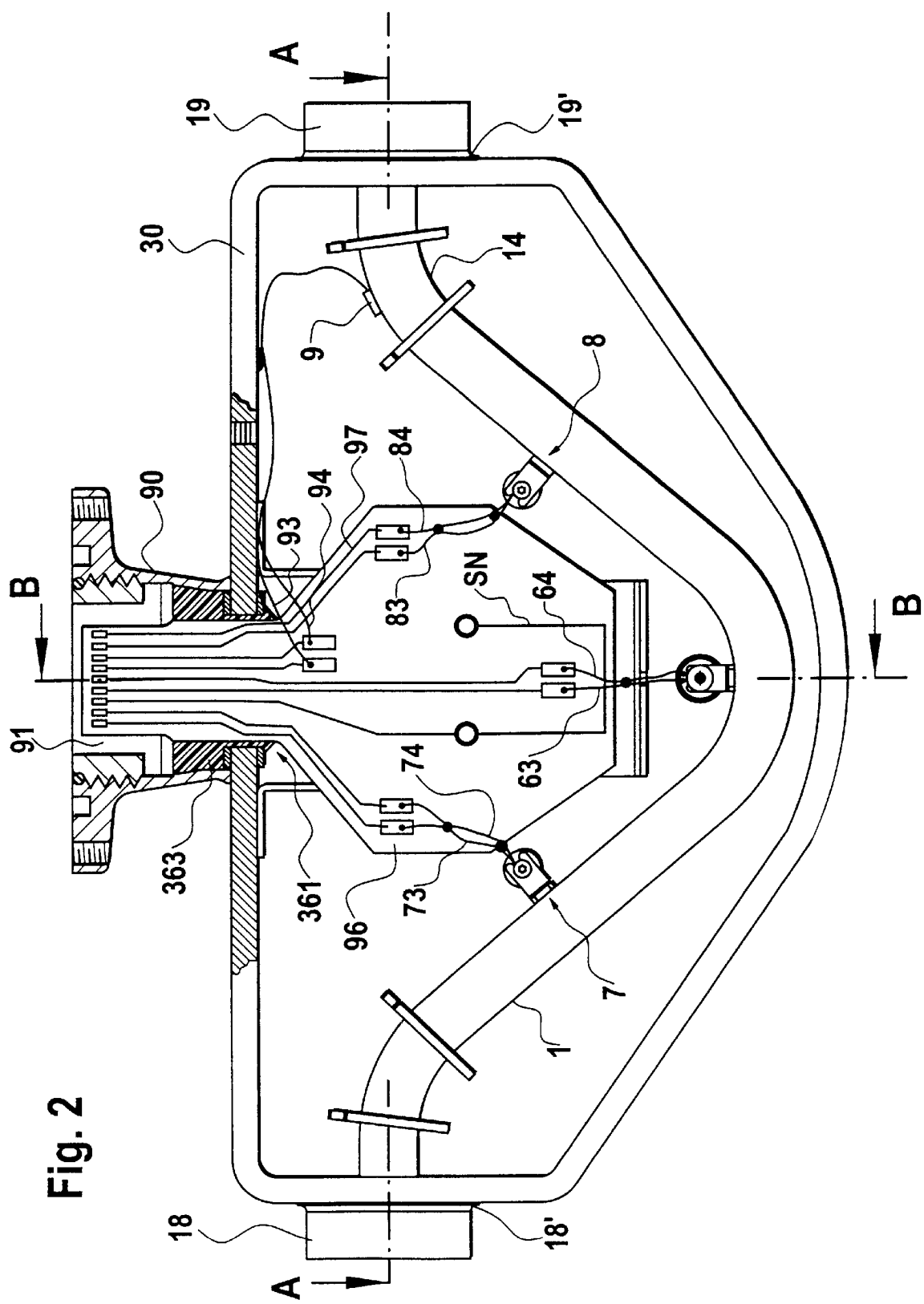
FIG. 2 is a front view of the Coriolis mass flow sensor of FIG. 1, again with its housing not completed, but with additional electrical details.

To show the internal construction of the sensor, the housing in FIG. 1 is shown uncompleted. FIG. 2 is a corresponding front view with additional electrical details.

Figure 4:
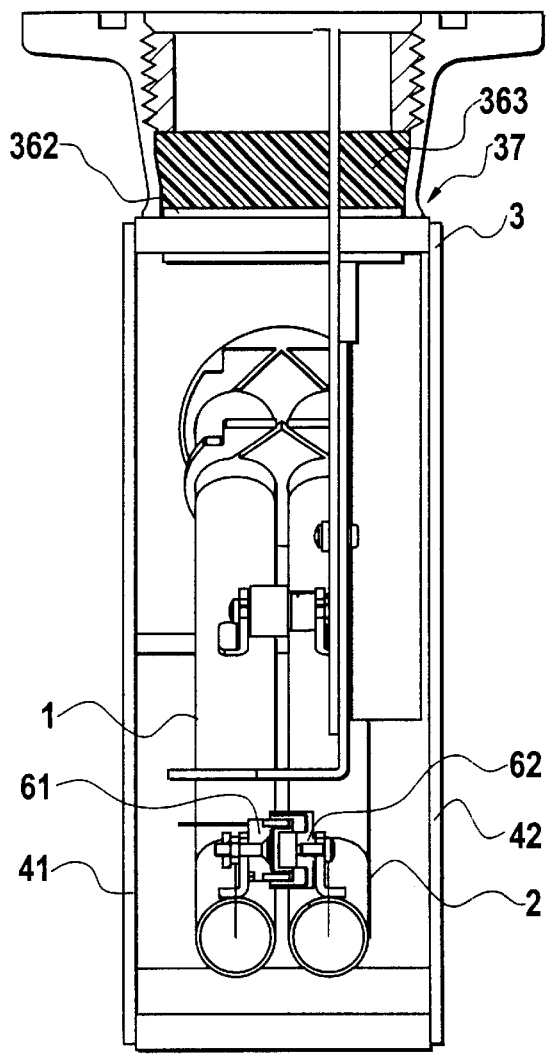
FIG. 4 is a section taken along line B—B of FIG. 2, showing the Coriolis mass flow sensor in a side view, again with its housing completed.
Figure 3:
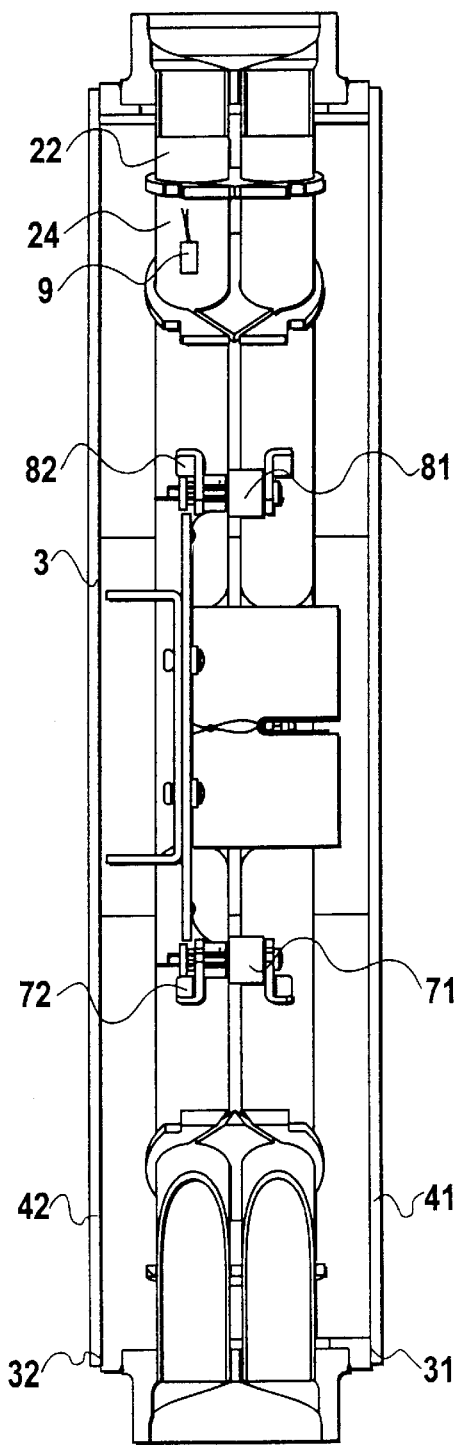
FIG. 3 is a section taken along line A—A of FIG. 2, showing the Coriolis mass flow sensor in a plan view, but now with its housing completed.

FIGS. 3 and 4 are sectional views of FIG. 2 with the housing completed. Because of the representation chosen, i.e., a perspective FIG. 1 along with front, plan, and side views, the figures will not be described one after the other, but will be discussed together.

Sensor 10 is designed to be connected, e.g., by means of flanges, into a pipe (not shown) of a given diameter through which flows a liquid, gaseous, or vaporous fluid to be measured. Instead of flanges, other known means, such as Triclamp connections or threaded joints, may be used for connecting sensor 10 into the pipe.

Sensor 10 has a first V-shaped flow tube 1, which is bent in a first plane symmetrically with respect to a first axis of symmetry. A second V-shaped flow tube 2 is bent in a second plane symmetrically with respect to a second axis of symmetry. Flow tubes 1, 2 are arranged parallel to each other, and each of them is of one-piece construction.

Flow tube 1 has a straight inlet portion 11 with an inlet axis lying in the first plane, and a straight outlet portion 12 with an outlet axis lying in the first plane and aligned with the inlet axis; a common axis is thus obtained, which will hereinafter be referred to as an inlet/outlet axis.

Flow tube 2 has a straight inlet portion 21 with an inlet axis lying in the second plane, a straight outlet portion 22 (visible only in FIG. 3) with an outlet axis lying in the second plane and aligned with the inlet axis; this common axis, too, will hereinafter be referred to as an inlet/outlet axis.

Flow tube 1 further has an inlet bend 13 connected with inlet portion 11, an outlet bend 14 connected with outlet portion 12, a first straight tube portion 15 connected with inlet bend 13, a second straight tube portion 16 connected with outlet bend 14, and a vertex bend 17 connected with the first and second straight tube portions 15, 16.

Flow tube 2 further has an inlet bend 23 connected with inlet portion 21, and outlet bend 24 (visible only in FIG. 3) connected with outlet portion 22, a first straight tube portion 25 connected with inlet bend 23, a second straight tube portion 26 connected with outlet bend 24, and a vertex bend 27 connected with the straight tube portions 25, 26. In the embodiment shown, the curvature of the axis of vertex bend 17 and that of vertex bend 27 correspond practically to the arc of a circle.

Inlet portions 11, 21 are fixed in an inlet manifold 18, and outlet portions 12, 22 are fixed in an outlet manifold 19. These manifolds 18, 19 are mounted in a support frame 30, which forms part of a housing 3 (visible only in FIGS. 3 and 4).

Flow tubes 1, 2 and manifolds 18, 19 are made of stainless steel. For flow tubes 1, 2, the stainless steel with the European material number 1.4539, corresponding to the American designation 904 L, is used, while manifolds 18, 19 are made of the stainless steel with the European material number 1.4404, corresponding to the American designation 316 L.

Sensor 10 is designed to be installed in a pipe through which a fluid to be measured flows at least temporarily. To that end, the manufacturer provides inlet and outlet manifolds 18, 19 with customized connection means, such as connections with an internal or external thread, flanges, or clamping devices as are commercially available under the registered trademark Triclamp, for example.

Like flow tubes 1, 2, support frame 30 is of one-piece construction. It was made from a flat bar of special steel and of constant width and thickness by suitably bending the bar and welding its ends, see the joint 33, and it has a front face 31 and a rear face 32 (visible only in FIGS. 3 and 4).

Support frame 30 comprises a plane inlet frame portion 34, in which inlet manifold 18 is fixed by welding, and a plane outlet frame portion 35, in which outlet manifold 19 is fixed by welding, see in FIG. 2 the portions 18 and 19 of the manifolds protruding from support frame 30, with associated welds 18' and 19', respectively.

Support frame 30 further comprises a plane feedthrough frame portion 36, which connects inlet frame portion 34 and outlet frame portion 35, and in which a feedthrough 37 (visible only in FIG. 4) is fixed in a pressure-tight manner. Feedthrough frame portion 36 forms respective right angles with inlet and outlet frame portions 34, 35.

Support frame 30 further comprises a first plane extension portion 38, which extends from inlet frame portion 34 at an angle of approximately 120°. Support frame 30 finally comprises a bent vertex portion 39, which merges into extension portion 38, and a second plane extension portion 40, which extends from outlet frame portion 35 at the above-mentioned angle and merges into vertex portion 39.

Support frame 30 is supplemented by a plane front sheet 41 of stainless steel welded to front face 31 and a plane rear sheet 42 of the same steel welded to rear face 32 to form the housing 3, so that the latter is pressure-tight. Front and rear sheets 41, 42 can only be seen in FIGS. 3 and 4. The steel used for housing 3 is the stainless steel with the European material number 1.4301, corresponding to the American designation 304.

The plane front and rear sheets 41, 42 result in a higher stiffness of housing 3 under compressive stress in the direction of the inlet/outlet axis than if these sheets were provided with longitudinal crimps.

Flow tubes 1, 2 are rigidly connected by a first node plate 51 in the vicinity of a location where the respective inlet portion 11, 21 merges into the respective inlet bend 13, 23, and by a second mode plate 52 in the vicinity of a location where the respective inlet bend 13, 23 merges into the respective first straight tube portion 15, 25.

Furthermore, flow tubes 1, 2 are rigidly connected by a third node plate 53 in the vicinity of a location where the respective outlet portion 12, 22 merges into the respective outlet bend 14, 24, and by a fourth node plate 54 in the vicinity of a location where the respective outlet bend 14, 24 merges into the respective second straight tube portion 16, 26.

The four node plates 51, 52, 53, 54 are thin disks of the same stainless steel as that used for housing 3. These disks are provided with holes whose diameters correspond to the outside diameters of flow tubes 1, 2, and with slots, so that they can be first clamped onto and then brazed to flow tubes 1, 2, with the slots being brazed together as well, so that the disks are seated on flow tubes 1, 2 unslotted as node plates.

In operation, an excitation assembly 6 vibrates flow tubes 1, 2 in the manner of a tuning fork at a frequency equal or close to the mechanical resonance frequency of the vibrating system formed by flow tubes 1, 2. This vibration frequency, as is well known, is dependent on the density of the fluid passing through flow tubes 1, 2.

Therefore, the density of the fluid can be determined from the vibration frequency. Since the density of the fluid is dependent on its temperature, the latter is also measured, see below.

A first portion 61 of excitation assembly 6 is fixed to vertex bend 17 of flow tube 1 in the area of the above-mentioned axis of symmetry of this tube, and a second portion 62 of excitation assembly 6 is fixed to vertex bend 27 of flow tube 2 in the area of the above-mentioned axis of symmetry of this tube, see FIG. 4.

Excitation assembly 6 is an electrodynamic excitation assembly, i.e., portion 61 is a coil assembly and portion 62 a permanent-magnet assembly that cooperates with the coil assembly by riding therein.

The excitation assembly 6 is supplied with AC power from an excititation circuit 20, which supplies drive energy to the vibrating system formed by flow tubes 1, 2 on its instantaneous resonance frequency.

A first velocity or displacement transducer 7 and a second velocity or displacement transducer 8, which are mounted to flow tubes 1, 2 symmetrically with respect to the aforementioned axes of symmetry, produce measurement signals from which a mass flow rate as well as a density of the fluid can be determined.

A first portion 71 of velocity or displacement transducer 7 is fixed to the straight portion 15 of flow tube 1, and a second portion 72 is fixed to the straight portion 25 of flow tube 2, see FIG. 3. A first portion 81 of velocity or displacement transducer 8 is fixed to the straight portion 16 of flow tube 1, and a second portion 82 is fixed to the straight portion 26 of flow tube 2, see FIG. 3.

In this embodiment, velocity or displacement transducers 7, 8 are electrodynamic velocity transducers; thus, each of portions 71, 81 is a coil assembly, and each of portions 72, 82 is a permanent-magnet assembly that can ride in the associated coil assembly.

As already briefly mentioned above, feedthrough 37, which contains several electric conductors, is mounted in support frame 30 opposite vertex bends 17, 27, and thus opposite vertex frame portion 39, particularly in a pressure-tight manner. To that end, a flange 90 is attached to support frame 30, e.g., by welding. Flange 90 has a hole 91, so that feedthrough 37 is accessible from outside housing 3.

Feedthrough 37 comprises a printed-circuit board 96, which is fastened to support frame 30 by means of an angled support plate 95 and which extends between support frame 30 and the vertex bends toward the latter. Printed-circuit board 96 has conducting tracks formed thereon, cf. conducting track 97, which are only visible in FIG. 2.

Connected to respective ones of these conducting tracks are leads 63, 64 of excitation assembly 6, leads 73, 74 of velocity transducer 7, leads 83, 84 of velocity transducer 8, and leads 93, 94 of a temperature transducer 9, which are thus also connected to the individual conductors of feedthrough 37. Leads 63, 64, 73, 74, 83, 84, 93, 94 can only be seen in FIG. 2. In addition, a conducting track SN to ground is provided on the printed-circuit board, which is mechanically and, thus, electrically attached to the metallic support plate 95.

Temperature transducer 9 (visible only in FIGS. 2 and 3) is attached to outlet bend 14 of flow tube 1, for instance with adhesive, and is a platinum resistance element, for example. As mentioned above, it serves to measure the current temperature of the fluid. Temperature transducer 9 may also be positioned at any other suitable location of flow tubes 1, 2.

Feedthrough 37 further comprises a slot 361 formed in feedthrough frame portion 36, through which the printed-circuit board 96 is passed and which extends into flange 90, with a distance sufficient for electrical isolation being maintained between printed-circuit board 96 and slot 361.

Furthermore, printed-circuit board 96 is passed through a disk 362 of insulating material resting on feedthrough frame portion 36. An insulating compound 363 completely fills a portion of hole 91 lying above disk 362, and may also have penetrated into the space between printed-circuit board 96 and the internal wall of slot 363.

The thickness of insulating compound 363 in the direction of the open end of hole 91 is at least equal to the gap length required for type of protection Ex-d according to European Standards EN 50014 and EN 50018 as a function of gap width. These standards correspond to comparable standards of other countries.

The excitation circuit 20, which is explained below, is housed together with the associated evaluation circuit in an electronics case (not shown) connected with flange 90.

In place of the preferred sensor of FIGS. 1 to 4, other prior-art sensors having at least one bent flow tube, e.g., the sensors of U.S. Pat. Nos. 5,394,758, 5,557,973, 5,675,093, 5,705,754, 5,796,011, or 6,223,605, can be used together with the invention.

Also suited for use with the invention are sensors having at least one straight flow tube, such as the sensors of U.S. Pat. Nos. 4,793,191, 5,351,561, 5,531,126, 5,602,345, 5,616,868, 5,736,653, or 6,006,609.

Figure 5:
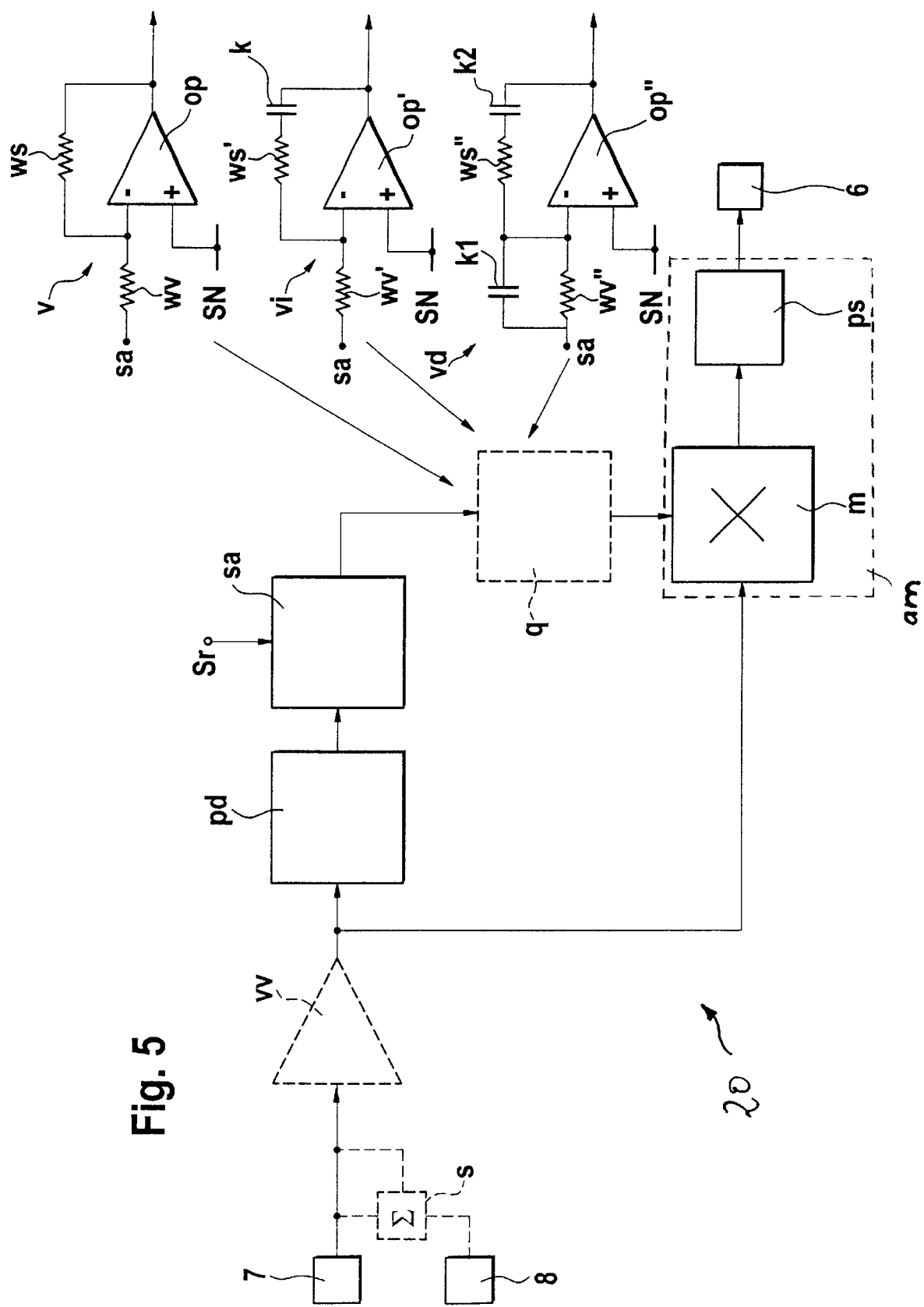
FIG. 5 shows, partly in block-diagram form, the circuit diagram of an embodiment of an excitation circuit according to the first variant of the invention.

FIG. 5 shows, partly in block-diagram form, the circuit diagram of an embodiment of excitation circuit 20 according to the first variant of the invention. A demodulation stage pd receives one of the transducer signals or their sum as its input signal. Consequently, demodulation stage pd has its input connected to one of the velocity or displacement transducers, henceforth called "transducers" for short; in FIG. 5, this is transducer 7. The demodulation stage serves to determinig an oscillation amplitude of tube vibrations.

Further, the stage pd is operable to generate an output signal representing said detected oscillation amplitude of the vibrating tube. Therefore, in a preferred embodiment of the invention the demodulation stage pd comprises a peak detector for said input signal. Instead of a peak detector a lock-in amplifier which is clocked by a reference signal being in phase with the input signal may be used for detecting the amplitude of the input signal of the demodulation stage pd.

A first input of a comparsion stage sa is connected to an output of demodulation stage pd; a second input of comparsion stage sa is fed an adjustable reference signal Sr which specifies an amplitude of the vibration of flow tubes 1, 2. Comparsion stage sa determines a deviation of the output signal of demodulation stage pd from the reference signal Sr. This deviation may be determined as an absolut error by using a simple difference between the detected amplitude and the predetermined amplitude specified by the reference signal Sr, or as an relativ error by using a ratio of the detected and the predetermined amplitudes.

A first input of an amplitude modulation stage am receives the input signal to demodulation stage pd, and a second input receives the output signal from comparsion stage sa. The amplitude modulation stage am serves to modulate said input signal of the demodulation stage with the output signal from the comparision stage. For these purposes, in a prefered embodiment the amplitude modulation stage am comprises a simple multiplier circuit m, as shown in FIG. 6.

The transducer signal or the sum of the two transducer signals—or a respective signal proportional thereto, see below—is the carrier signal, and the output signal from comparsion stage sa is the modulating signal, which is—at least slowly—varying; it represents the deviation of the instantaneous vibration amplitude of the flow tube or of flow tubes 1, 2 from the vibration amplitude specified by reference signal Sr.

Furthermore, the amplitude modulation stage am is operable to generate a drive signal supplying the excitation assembly 6. Thus, amplitude stage am comprises a output stage ps for amplifying said input signal being modulated with said output signal from the comparision stage.

Figure 6:
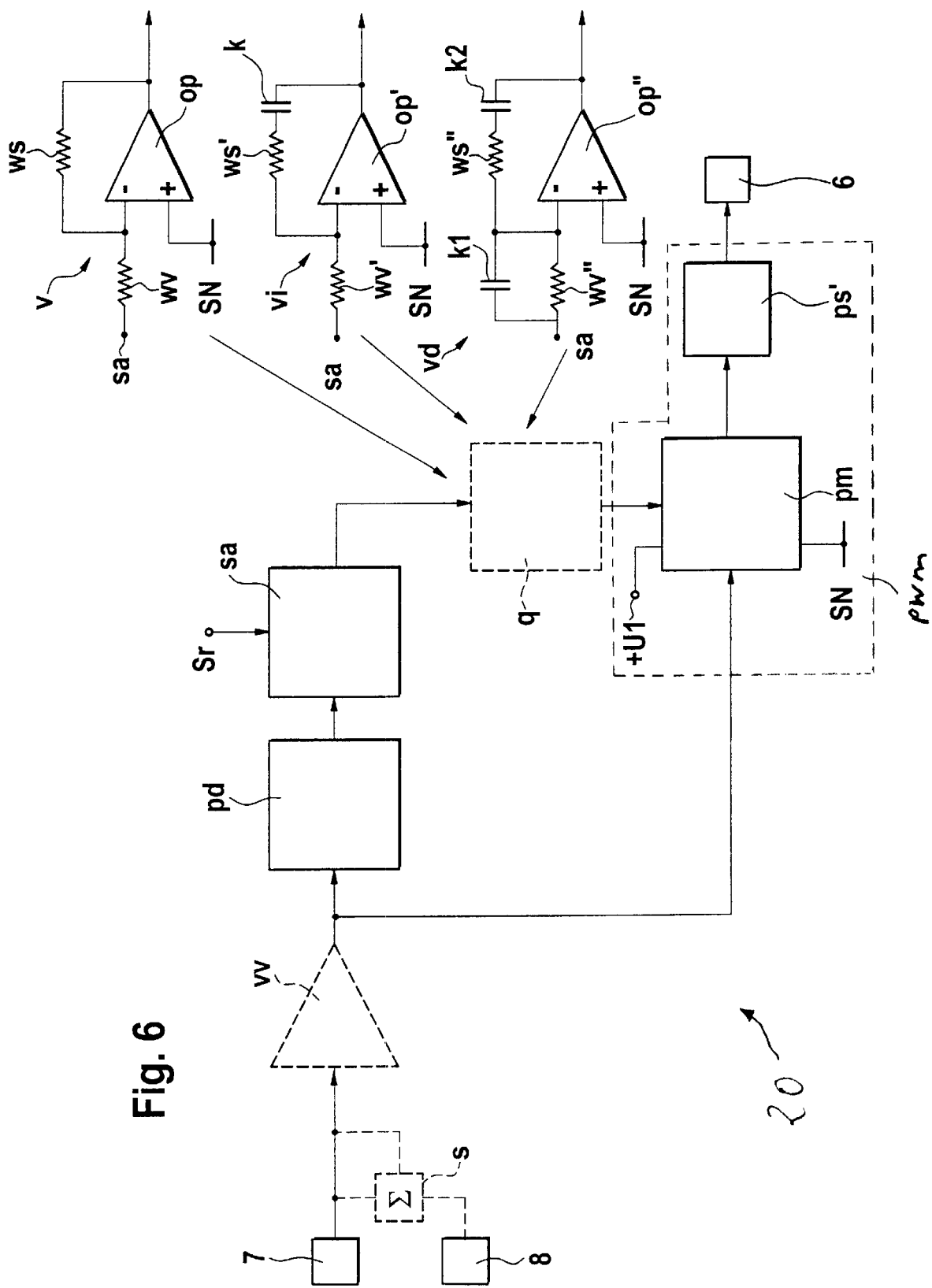
FIG. 6 shows, partly in block-diagram form, the circuit diagram of an embodiment of an excitation circuit according to the second variant of the invention.

FIG. 6 shows, partly in block-diagram form, the circuit diagram of an embodiment of excitation circuit 20 according to the second variant of the invention. The embodiment of FIG. 6 differs from that of FIG. 5 in that the amplitude modulation stage am of FIG. 5 has been replaced by a pulse width modulation stage pwm comprising a puls duration modulator pm being clocked by an external AC-signal. Pulse duration modulator pm, shown in FIG. 6, operates on a constant positive first DC voltage +U1 and is connected to ground SN.

A first input of puls duration modulator pm—this is the carrier signal input—receives the input signal of demodulation stage pd. Thus, this first input is connected to one of the transducers; in FIG. 6, this is again transducer 7.

A second input of puls duration modulator pm—this is the modulating-signal input—receives the output signal from comparsion stage sa. The output of pulse duration modulator pm is adjusted by an output stage ps' which delivers a drive signal for excitation assembly 6. This drive signal being a square wave signal clocked with a signal frequency of the input signal of demodulation stage pd and having pulse width modulated with the output signal from comparsion stage sa.

Figure 7:
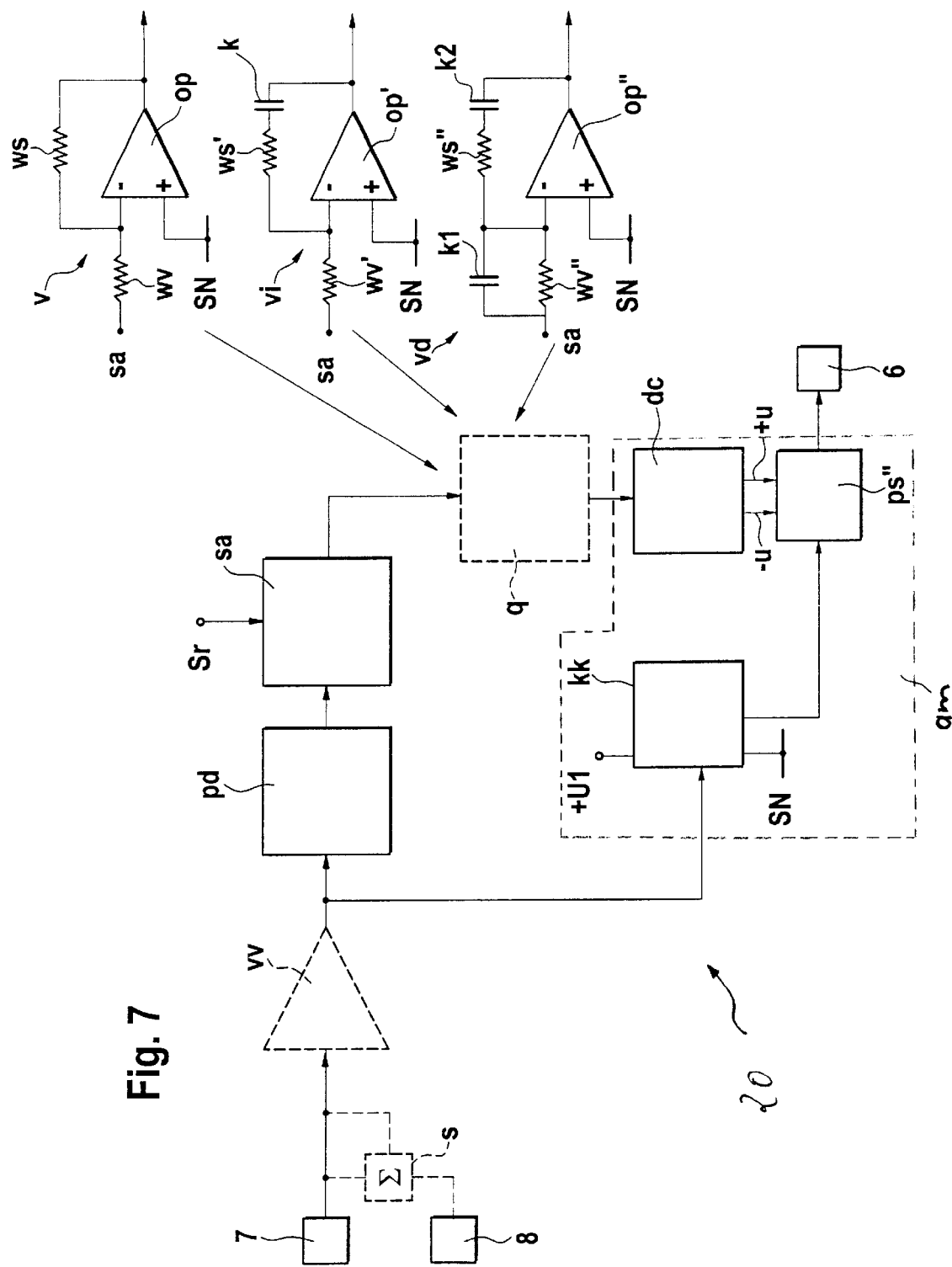
FIG. 7 shows, partly in block-diagram form, the circuit diagram of an embodiment of an excitation circuit according to the first variant of the invention.

FIG. 7 shows, partly in block-diagram form, the circuit diagram of an embodiment of excitation circuit 20 according to the third variant of the invention. The embodiment of FIG. 7 differs from that of FIG. 5 in that the multiplier m of FIG. 5 has been replaced by a comparator kk and a DC/DC converter DC which delivers at least one supply voltage for driving a switched excitation current in the excitation assembly 6.

The amplitude of the supply voltage depends on the output signal from comparsion stage sa and must therefore be regarded as non-constant. Depending on this supply voltage the excitation current may be a bi-polar, or an uni-polar current.

Therefore, in the embodiment as shown in FIG. 7 the DC/DC converter DC delivers supply voltage having a positiv first potential +u and a negative second potential −u. A control input of DC/DC, converter dc receives the output signal from comparsion stage sa. An output stage ps" is connected at the input end to an output of comparator kk; it is supplied with the potentials +u, −u provided by DC/DC converter dc, and supplies excitation assembly 6. Comparator kk operates on a constant DC voltage +U1 and is connected to ground SN. An input of comparator kk receives the input signal to peak detector pd. Thus, comparator kk is connected at the input end to one of the transducers; in FIG. 7, this is again transducer 7.

In FIGS. 5 to 7 it is indicated by broken lines that instead of one of the signals from transducers 7, 8, the sum of these signals may be fed to peak detector pd and to multiplier m or pulse duration modulator pm or comparator kk; in that case, these transducer signals must be passed through a summer s.

FIGS. 5 to 7 include further subcircuits represented by broken lines, which constitute preferred developments of the excitation circuit of the invention.

In a development the amplitude modulation stage am is provided with a preamplifier vv for the input signal. The preamplifier vv may be connected ahead of the peak detector and the lock-in amplifier, respectively.

In a development of the excitation circuit 20 an amplifier v amplifies the output signal from comparsion stage sa before it is applied to multiplier m. Such an amplifier may be an operational amplifier op whose noninverting input is connected to ground SN and whose inverting input is connected via a dropping resistor wv to the output of comparsion stage sa and via a shunt resistor ws to the amplifier output. The operational amplifier wired in this way, op, can be seen in FIGS. 5 to 7 on the upper right.

In a further development of the excitation circuit 20 an integrating amplifier vi amplifies and integrates the output signal from comparsion stage sa before it is applied to multiplier m. Such an amplifier may be an operational amplifier op' whose noninverting input is connected to ground SN and whose inverting input is connected via a dropping resistor wv' to the output of comparsion stage sa and via a series combination of a shunt resistor ws' and a capacitor k to the amplifier output. The operational amplifier wired in this way, op', can be seen in FIGS. 5 to 7 on the right-hand side in the middle.

In another development of the excitation circuit 20 a differentiating and integrating amplifier vd amplifies, differentiates, and integrates the output signal from comparsion stage sa before it is applied to multiplier m. Such an amplifier may be an operational amplifier op" whose noninverting input is connected to ground SN and whose inverting input is connected via a parallel combination of a dropping resistor wv" and a first capacitor k1 to the output of comparsion stage sa and via a series combination of a shunt resistor ws" and a second capacitor k2 to the amplifier output. The operational amplifier wired in this way, op", can be seen in FIGS. 5 to 7 on the lower right.

The arrows in FIGS. 5 to 7 indicate that the respective amplifier v, vi, vd has to be put in the place of the square q represented by broken lines, which is located either between the output of comparsion stage sa and the second input of amplitude modulation stage am, or between the output of comparsion stage sa and the modulating-signal input of pulse width modulation stage pwm, respectively.

It is within the scope of the invention that the functions of the individual subcircuits of FIGS. 5 to 7 are implemented with suitable analog or digital subcircuits, i.e., in the latter case with a suitably programmed microprocessor, for example, in which case the signals to be applied to the latter have to be subjected to an analog-to-digital conversion, while its output signals may have to be subjected to a digital-to-analog conversion.

Figure 8:
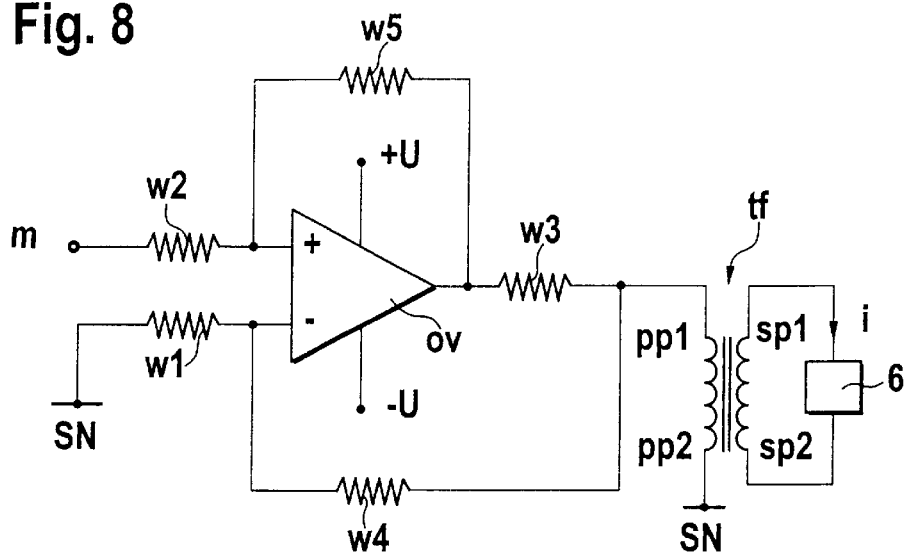
FIG. 8 is a circuit diagram of an embodiment of a preferred output stage of the excitation circuit of FIG. 5.

FIG. 8 is a schematic circuit diagram of a first preferred embodiment of an output stage ps provided in the amplitude modulation stage am, which is shown in FIG. 5.

An operational amplifier ov operates on a positive constant DC voltage +U and a negative constant DC voltage −U and is wired as follows. An inverting input is connected through a first resistor w1 to ground SN, and a noninverting input is connected through a second resistor w2 to the output of multiplier m.

An output of operational amplifier ov is connected via a third resistor w3 to a first terminal pp1 of a primary winding of a transformer tf; a second terminal pp2 of the primary winding is connected to ground SN. Transformer tf also has a secondary winding, whose two terminals sp1, sp2 are connected to excitation assembly 6.

The primary winding has a number of turns N1, and the secondary winding has a number of turns N2. Transformer tf is a step-up transformer and has a turns ratio N1/N2 of, e.g., 20:1.

The inverting input of operational amplifier ov is connected via a fourth resistor w4 to the first terminal pp1 of the primary winding. The noninverting input is connected via a fifth resistor w5 to the output.

The five resistors w1, w2, w3, w4, w5 have respective resistance values R1, R2, R3, R4, R5. Value R1 must be chosen to be equal to value R2, and value R4 must be chosen to be equal to value R5. If $u_m$ is the output voltage of multiplier m, the alternating current i flowing in excitation assembly 6 is given by $$i = u_m \cdot \frac{R5}{R1 \cdot R3} \cdot \frac{N1}{N2}$$

Figure 9:
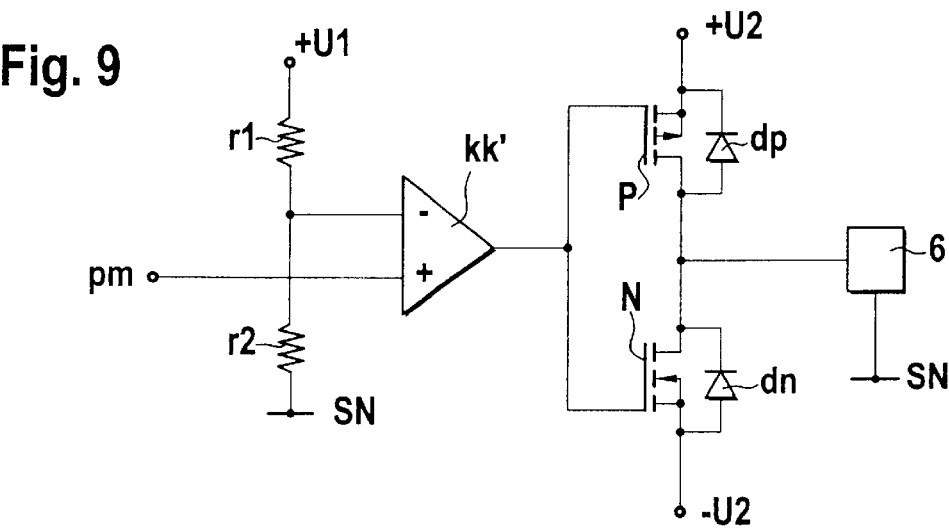
FIG. 9 is a circuit diagram of an embodiment of a preferred output stage of the excitation circuit of FIG. 6.

FIG. 9 is a schematic circuit diagram of a second preferred embodiment of an output stage ps' provided in the pulse duration modulation stage pwm, which is shown in FIG. 6. The "core" of this embodiment of output stage ps', which is a complementary push-pull stage, is a series combination of the controlled current paths of a P-channel enhancement-mode insulated-gate field-effect transistor P and an N-channel enhancement-mode insulated-gate field-effect transistor N, hereinafter referred to as transistors for short.

Excitation assembly 6 is connected to the junction point of the controlled current paths. Each controlled current path is shunted by a protective diode dn, dp, with the respective cathode connected to the more positive point of the respective transistor.

The P-transistor-side end of the series combination is connected to a constant positive second DC voltage +U2, and its N-transistor-side end is connected to a corresponding negative DC voltage −U2. The gates of transistors N, P are connected together and to an output of a comparator kk'. The noninverting input of comparator kk' is connected to the output of pulse duration modulator pm, see FIG. 6.

The inverting input of comparator kk' is connected to a tap of a voltage divider consisting of a resistor r1 and a resistor r2. Resistors r1, r2 are of equal value and are connected between the positive DC voltage +U1 and ground SN. Resistors r1, r2 and comparator kk' serve to balance the output signal of pulse duration modulator pm with respect to half the value of the DC voltage +U1.

Thus, excitation assembly 6 receives a positive current pulse on each positive-going zero crossing of the output signal from transducer 7 or of the sum of the output signals from transducers 7, 8, and a negative current pulse on each negative-going zero crossing of the output signal from transducer 7 or of the sum of the output signals from transducers 7, 8. The respective duration of these current pulses adjusts itself automatically so that the vibration amplitude of the flow tube or of flow tubes 1, 2 specified by reference signal Sr is reached.

Figure 10:
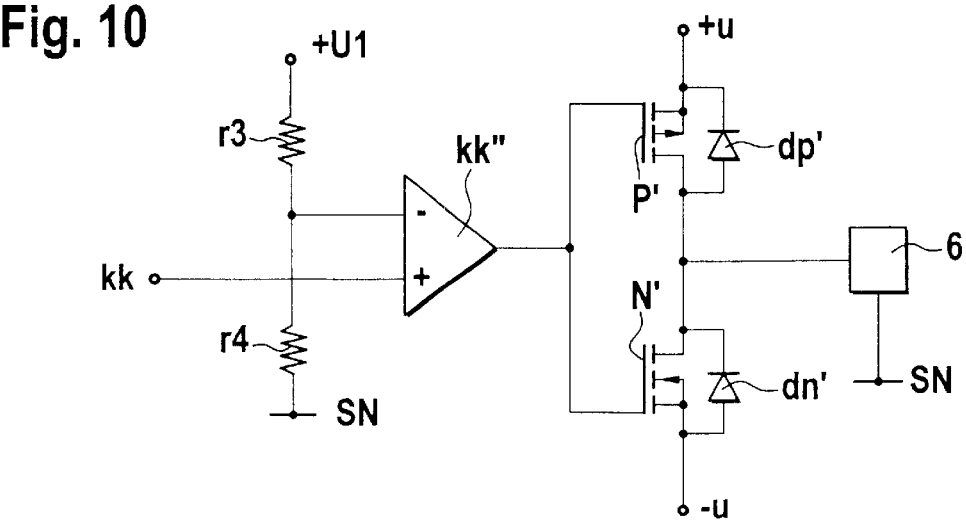
FIG. 10 is a circuit diagram of an embodiment of a preferred output stage of the excitation circuit of FIG. 7.

FIG. 10 is a schematic circuit diagram of a third preferred embodiment of an output stage ps" provided in the amplitude modulation stage am, which is shown in FIG. 7. Like in FIG. 9, the "core" of this embodiment of output stage ps", which is again a complementary push-pull stage, is a series combination of the controlled current paths of a P-channel enhancement-mode insulated-gate field-effect transistor P' and an N-channel enhancement-mode insulated-gate field-effect transistor N', henceforth referred to as transistors for short.

Excitation assembly 6 is connected to the junction point of the controlled current paths. Each controlled current path is shunted by a protective diode dn', dp', with the respective cathode connected to the more positive point of the respective transistor.

The P-transistor-side end of the series combination is connected to the positive DC voltage +u, which is dependent on the output signal from comparsion stage sa, and its N-transistor-side end is connected to the negative DC voltage −u, which is dependent on the output signal from comparsion stage sa. The gates of transistors N', P' are connected together and to an output of a comparator kk". The noninverting input of comparator kk" is connected to the output of comparator kk, see FIG. 7.

The inverting input of comparator kk" is connected to a tap of a voltage divider consisting of a resistor r3 and a resistor r4. Resistors r3, r4 are of equal value and are connected between the constant positive first DC voltage +U1 and ground SN. Resistors r3, r4 and comparator kk" serve to balance the output signal from comparator kk with respect to half the value of the DC voltage +U1.

Thus, excitation assembly 6 receives a positive current pulse during each positive half-cycle of the output signal from transducer 7 or of the sum of the output signals from transducers 7, 8, and a negative current pulse during each negative half-cycle of the output signal from transducer 7 or of the sum of the output signals from transducers 7, 8. The respective amplitude of these current pulses is dependent on the DC voltages +u, −u, which in turn depend on the output signal from comparsion stage sa, so that the vibration amplitude of the flow tube or flow tubes 1, 2 specified by reference signal Sr adjusts itself automatically.

The DC voltages +U1, +U2, −U2 are generated in the usual manner on the basis of the power made available by the two-wire process control loop. It is also possible to provide only a single positive DC voltage instead of the two positive DC voltages +U1, +U2.

In the invention, the aforementioned two-wire process control loop preferably carries a DC supply current, with the measurement signal, in particular, also being a direct current, for instance a current in the standard range of 4 to 20 mA. On the other hand, the measurement signal may also preferably be a digital signal, so that the two-wire process control loop can be connected to a field bus.

The excitation circuit of the invention and the flow tube or flow tubes 1, 2 represent an automatic control system which electrically adjusts itself both to the mechanical resonance frequency of the excited vibrations of the flow tube or of flow tubes 1, 2 and to the amplitude of these vibrations specified by reference signal Sr.

Therefore, the hitherto used excitation circuits, which comprise an amplitude control stage and a phase-locked loop (PLL) for electrically controlling the resonance frequency and the vibration amplitude, are not necessary. The conventional excitation circuits require not only a great number of components, but also much more power than is available in two-wire meters.

As the excitation circuit 20 of the invention requires only few components, the total power dissipation of the latter is virtually negligible, so that the available low power is usable nearly completely for the excitation.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. An excitation circuit for a Coriolis mass flowmeter, said flowmeter having at least one vibrating flow tube, an electromechanical excitation assembly for vibrating the at least one flow tube at a frequency equal or adjacent to the instantaneous mechanical resonance frequency of the flow tube; a tranducer assembly for generating a first transducer signal representing inlet-side vibrations of said measuring tube and a second transducer signal representing outlet-side vibrations of said measuring tube, said excitation circuit comprising:

an demodulation stage fed by one of the transducer signals or a sum of both transducer signals, said demodulation stage being operable to generate an output signal representing an oscillation amplitude of said vibrating tube, a comparison stage fed by the output signal of the demodulation stage, said comparison stage being operable to generate an output signal representing a deviation of said oscillation amplitude of the vibrating tube from an predetermined reference oscillation amplitude for said vibrations;

an amplitude modulation stage for modulating said signal fed to the demodulation stage with said output signal from the comparision stage, said amplitude stage being operable to generate a drive signal for supplying said excitation assembly.

2. The excitation circuit as claimed in claim 1 wherein the demodulation stage comprises a peak detector for detecting the amplitude of said signal fed to the demodulation stage.

3. The excitation circuit as claimed in claim 1 wherein the demodulation stage comprises a preamplifier for preamplifying said signal fed to the demodulation stage.

4. The excitation circuit as claimed in claim 1 wherein the comparsion stage comprises an amplifier.

5. The excitation circuit as claimed in claim 1 wherein the comparsion stage comprises an integrating amplifier.

6. The excitation circuit as claimed in claim 1 wherein the comparsion stage comprises a differentiating and integrating amplifier.

7. The excitation circuit as claimed in claim 1 wherein the amplitude modulation stage comprises an output stage with an operational amplifier wired as follows:
- an inverting input is connected to ground through a first resistor;
- a noninverting input is connected to the output of the multiplier through a second resistor, which has the same value as the first resistor;
- an output is connected via a third resistor to a first terminal of a primary winding of a transformer, a second terminal of which primary winding is connected to ground, said transformer having a secondary winding connected to the electromechanical excitation assembly and being a step-up transformer;
- the inverting input is connected via a fourth resistor to the first terminal of the primary winding; and
- the noninverting input is connected via a fifth resistor, which has the same value as the fourth resistor, to the output.

8. The excitation circuit as claimed in claim 1 wherein the amplitude modulation stage comprises an output stage having a complementary push-pull stage which is supplied with the DC voltage delivered by the DC/DC converter.

9. An excitation circuit for a Coriolis mass flowmeter, said flowmeter having at least one vibrating flow tube, an electromechanical excitation assembly for vibrating the at least one flow tube at a frequency equal or adjacent to the instantaneous mechanical resonance frequency of the flow tube; a tranducer assembly for generating a first transducer signal representing inlet-side vibrations of said measuring tube and a second transducer signal representing outlet-side vibrations of said measuring tube, said excitation circuit comprising:
- an demodulation stage fed by one of the transducer signals or a sum of both transducer signals, said demodulation stage being operable to generate an output signal representing an oscillation amplitude of said vibrating tube,
- a comparison stage fed by the output signal of the demodulation stage, said comparison stage being operable to generate an output signal representing a deviation of said oscillation amplitude of the vibrating tube from an predetermined reference oscillation amplitude for said vibrations;
- an pulse duration modulation stage for modulating said signal fed to the demodulation stage with said output signal from the comparision stage, said pulse duration stage being operable to generate a drive signal for supplying said excitation assembly.

10. The excitation circuit as claimed in claim 9 wherein the comparsion stage comprises an amplifier.

11. The excitation circuit as claimed in claim 9 wherein the comparsion stage comprises an integrating amplifier.

12. The excitation circuit as claimed in claim 9 wherein the comparsion stage comprises a differentiating and integrating amplifier.

13. A two-wire Coriolis mass flowmeter which is connected to, is powered exclusively from, and outputs a measurement signal exclusively via a two-wire process control loop, said Coriolis mass flowmeter having at least one vibrating flow tube, an electromechanical excititation assembly for vibrating the at least one flow tube at a frequency equal or adjacent to the instantaneous mechanical resonance frequency of the flow tube, a transducer assembly for generating a first transducer signal representing inlet-side vibrations of said measuring tube and a second transducer signal representing outlet-side vibrations of said measuring tube, and an excitation circuit, said excitation circuit comprising:
- a demodulation stage fed by one of the transducer signals or a sum of both transducer signals, said demodulation stage being operable to generate an output signal representing an oscillation amplitude of said vibrating tube,
- a comparison stage fed by the output signal of the demodulation stage, said comparison stage being operable to generate an output signal representing a deviation said oscillation amplitude of the vibrating tube from an predetermined reference oscillation amplitude of said vibrations;
- an amplitude modulation stage for modulating said signal fed to the demodulation stage with said output signal from the comparison stage, said amplitude stage being operable to generate a drive signal for supplying said excitation assembly.

14. The two-wire Coriolis mass flowmeter as claimed in claim 13, wherein the demodulation stage comprises a peak detector for detecting the amplitude of said signal fed to the demodulation stage.

15. The two-wire Coriolis mass flowmeter as claimed in claim 14, wherein the two-wire process control loop carries a D.C. supply current, and in particular wherein the measurement signal is a direct current, preferably in a range of 4 to 20 mA.

16. The two-wire Coriolis mass flowmeter as claimed in claim 13, wherein the demodulation stage comprises a preamplifier for preamplifying said signal fed to the demodulation stage.

17. The two-wire Coriolis mass flowmeter as claimed in claim 16, wherein the two-wire process control loop carries a D.C. supply current, and in particular wherein the measurement signal is a direct current, preferably in a range of 4 to 20 mA.

18. The two-wire Coriolis mass flowmeter as claimed in claim 13, wherein the comparison stage comprises an amplifier.

19. The two-wire Coriolis mass flowmeter as claimed in claim 18, wherein the two-wire process control loop carries a D.C. supply current, and in particular wherein the measurement signal is a direct current, preferably in a range of 4 to 20 mA.

20. The two-wire Coriolis mass flowmeter as claimed in claim 13, wherein the comparison stage comprises an integrating amplifier.

21. The two-wire Coriolis mass flowmeter as claimed in claim 20, wherein the two-wire process control loop carries a D.C. supply current, and in particular wherein the measurement signal is a direct current, preferably in a range of 4 to 20 mA.

22. The two-wire Coriolis mass flowmeter as claimed in claim 13, wherein the comparison stage comprises a differentiating and integrating amplifier.

23. The two-wire Coriolis mass flowmeter as claimed in claim 22, wherein the two-wire process control loop carries a D.C. supply current, and in particular wherein the measurement signal is a direct current, preferably in a range of 4 to 20 mA.

24. The two-wire Coriolis mass flowmeter as claimed in claim 13, wherein the amplitude modulation stage comprises an output stage with an operational amplifier wired as follows:

- an inverting input is connected to ground through a first resistor;
- a noninverting input is connected to the output of the amplifier through a second resistor, which has the same value as the first resistor;
- an output is connected via a third resistor to a first terminal of a primary winding of a transformer, a second terminal of which primary winding is connected to ground, said transformer having a secondary winding connected to the electromechanical excitation assembly and being a step-up transformer;
- the inverting input is connected via a fourth resistor to the first terminal of the primary winding; and
- the noninverting input is connected via a fifth resistor, which has the same value as the fourth resistor, to the output.

25. The two-wire Coriolis mass flowmeter as claimed in claim 24, wherein the two-wire process control loop carries a D.C. supply current, and in particular wherein the measurement signal is a direct current, preferably in a range of 4 to 20 mA.

26. The two-wire Coriolis mass flowmeter as claimed in claim 13, wherein the amplitude modulation stage comprises an output stage having a complementary push-pull stage which is supplied with the DC voltage delivered by the DC/DC converter.

27. The two-wire Coriolis mass flowmeter as claimed in claim 26, wherein the two-wire process control loop carries a D.C. supply current, and in particular wherein the measurement signal is a direct current, preferably in a range of 4 to 20 mA.

28. A two-wire Coriolis mass flowmeter which is connected to, is powered exclusively from, and outputs a measurement signal exclusively via a two-wire process control loop, said Coriolis mass flowmeter having at least one vibrating flow tube, an electromechanical excitation assembly for vibrating the at least one flow tube at a frequency equal or adjacent to the instantaneous mechanical resonance frequency of the flow tube, a transducer assembly for generating a first transducer signal representing inlet-side vibrations of said measuring tube and a second transducer signal representing outlet-side vibrations of said measuring tube, and an excitation circuit, said excitation circuit comprising:

- a demodulation stage fed by one of the transducer signals or a sum of both transducer signals, said demodulation stage being operable to generate an output signal representing an oscillation amplitude of said vibrating tube,
- a comparison stage fed by the output signal of the demodulation stage, said comparison stage being operable to generate an output signal representing a deviation of said oscillation amplitude of the vibrating tube from an predetermined reference oscillation amplitude of said vibrations;
- a pulse duration modulation stage for modulating said signal fed to the demodulation stage with said output signal from the comparison stage, said pulse duration stage being operable to generate a drive signal for supplying said excitation assembly.

29. The two-wire Coriolis mass flowmeter as claimed in claim 28, wherein the comparison stage comprises an amplifier.

30. The two-wire Coriolis mass flowmeter as claimed in claim 29, wherein the two-wire process control loop carries a D.C. supply current, and in particular wherein the measurement signal is a direct current, preferably in a range of 4 to 20 mA.

31. The two-wire Coriolis mass flowmeter as claimed in claim 28, wherein the comparison stage comprises an integrating amplifier.

32. The two-wire Coriolis mass flowmeter as claimed in claim 31, wherein the two-wire process control loop carries a D.C. supply current, and in particular wherein the measurement signal is a direct current, preferably in a range of 4 to 20 mA.

33. The two-wire Coriolis mass flowmeter as claimed in claim 28, wherein the comparison stage comprises a differentiating and integrating amplifier.

34. The two-wire Coriolis mass flowmeter as claimed in claim 33, wherein the two-wire process control loop carries a D.C. supply current, and in particular wherein the measurement signal is a direct current, preferably in a range of 4 to 20 mA.

* * * * *